W. M. McKINNEY.
SPUR.
APPLICATION FILED NOV. 6, 1909.
973,367.
Patented Oct. 18, 1910.
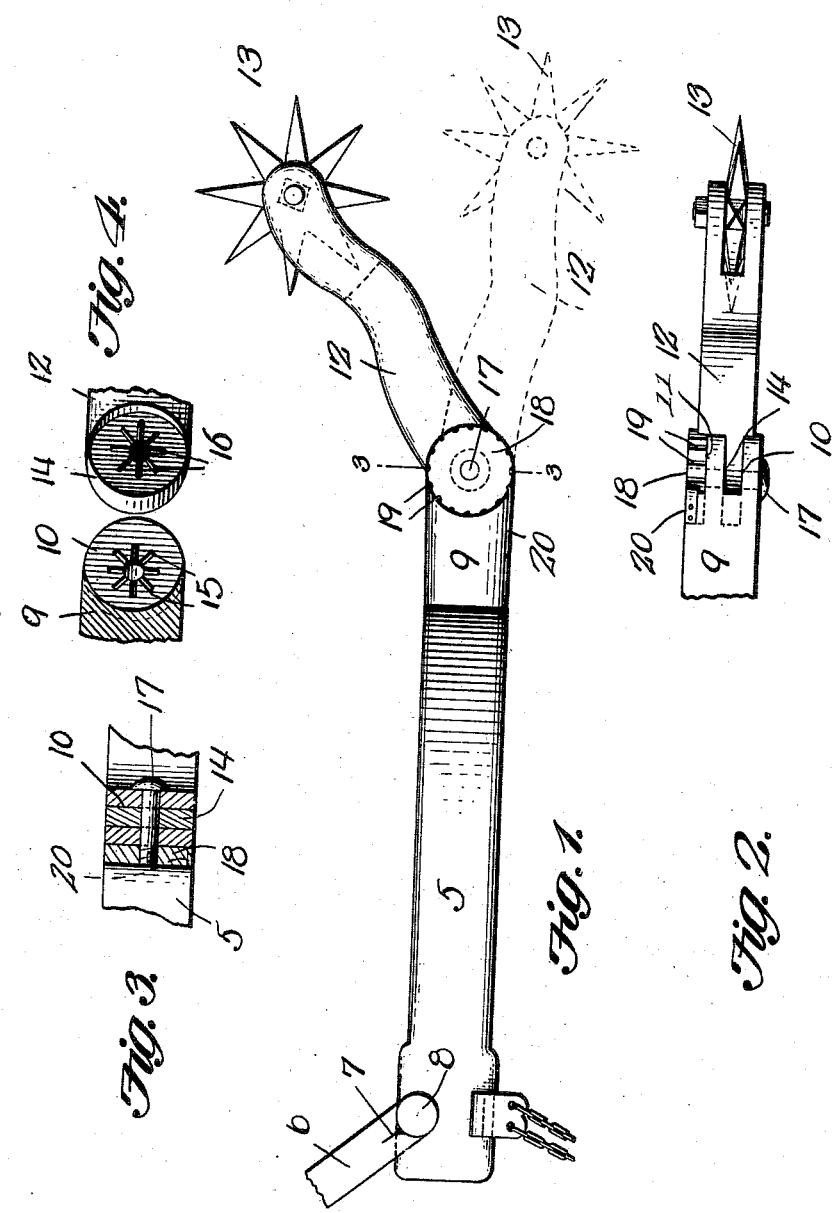

UNITED STATES PATENT OFFICE.

WILLIAM M. McKINNEY, OF CROWS LANDING, CALIFORNIA.

SPUR.

973,367.

Specification of Letters Patent. Patented Oct. 18, 1910.

Application filed November 6, 1909. Serial No. 526,557.

*To all whom it may concern:*

Be it known that I, WILLIAM M. MCKINNEY, a citizen of the United States, residing at Crows Landing, in the county of Stanislaus and State of California, have invented new and useful Improvements in Spurs, of which the following is a specification.

This invention relates to spurs, and it has for its object to construct a spur in which the rowel-carrying arm shall be adjustably connected with the heel-engaging clip in such a manner that it may be adjusted at various angles as may be desired.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawing,—Figure 1 is a side elevation of a spur constructed in accordance with the invention. Fig. 2 is a top plan view, showing a portion of the shank and the rowel-carrying arm connected therewith. Fig. 3 is a transverse sectional view taken on the plane indicated by the line 3—3 in Fig. 1. Fig. 4 is a detail view, showing in perspective the meeting ends of the shank and the rowel-carrying arm separated from each other.

Corresponding parts in the several figures are denoted by like characters of reference.

The improved spur includes the customary heel-engaging clip 5 having attaching means whereby it may be mounted upon the heel of a boot, said attaching means in the present instance including a strap 6 having a buttonhole 7 whereby it may be connected with a headed stud 8.

The clip 5 has a rearwardly extending shank 9, the outer end of which is provided with recesses 10 and 11. The arm 12 carrying at one end the rowel 13 is provided at its inner end with a lug 14 adapted for insertion into the recess 10, the side walls of said recess being provided with radial grooves 15 adapted for engagement with correspondingly disposed ribs 16 upon the side walls of the lug 14. The rowel-carrying arm is connected with the shank 9 by means of a transverse bolt 17 and a nut 18 which is seated in the recess 11, said nut being of circular form and provided with circumferentially disposed notches 19 adapted to be engaged by a spring 20 secured upon the arm 9, thereby locking the nut securely in position.

It is obvious that by releasing the nut the rowel-carrying arm may be turned upon the axis of the bolt 17 and may thus be adjusted at various angles with reference to the heel-engaging clip. By tightening the nut the parts will be securely retained in adjusted position, and the nut will be locked by engagement with the spring 20.

Having thus described the invention, what is claimed as new, is:—

A spur comprising a heel engaging clip having a rearwardly extending shank provided with vertical recesses, a rowel-carrying arm hingedly mounted in one of said recesses, a connecting bolt, and means including a lock nut seated in the other recess for preventing the rowel-carrying arm from turning about the axis of the connecting bolt.

In testimony whereof I affix my signature in presence of two witnesses.

WILLIAM M. McKINNEY.

Witnesses:
 ADELAIDE H. SMITH,
 HENRY S. ELLIS.